(12) United States Patent
Hosomi

(10) Patent No.: US 7,526,517 B2
(45) Date of Patent: Apr. 28, 2009

(54) MEASUREMENT INSTRUMENT

(75) Inventor: Tatsurou Hosomi, Kyoto (JP)

(73) Assignee: Arkray, Inc., Kyoto (JP)

( * ) Notice: Subject to any disclaimer, the term of this patent is extended or adjusted under 35 U.S.C. 154(b) by 979 days.

(21) Appl. No.: 10/451,612

(22) PCT Filed: Dec. 25, 2001

(86) PCT No.: PCT/JP01/11322

§ 371 (c)(1),
(2), (4) Date: Sep. 15, 2003

(87) PCT Pub. No.: WO02/052516

PCT Pub. Date: Jul. 4, 2002

(65) Prior Publication Data

US 2004/0220745 A1 Nov. 4, 2004

(30) Foreign Application Priority Data

Dec. 22, 2000 (JP) ............................ 2000-404533

(51) Int. Cl.
*G06F 15/02* (2006.01)
(52) U.S. Cl. ..................................... 708/131
(58) Field of Classification Search ............... 705/35, 705/40, 401, 403; 708/100, 105, 110, 131; 177/25.112, 25.119, 45
See application file for complete search history.

(56) References Cited

U.S. PATENT DOCUMENTS

| | | | | |
|---|---|---|---|---|
| 4,624,578 A | * | 11/1986 | Green | ........................ 368/10 |
| 5,892,458 A | | 4/1999 | Anderer et al. | |
| 5,893,076 A | * | 4/1999 | Hafner et al. | .................. 705/28 |

FOREIGN PATENT DOCUMENTS

| | | |
|---|---|---|
| JP | SHO 50-21598 | 6/1973 |
| JP | 64-43254 | 2/1989 |
| JP | 2-267683 | 11/1990 |
| JP | 4-178300 | 6/1992 |
| JP | 5-174217 | 7/1993 |
| JP | 8-123868 | 5/1996 |
| JP | 9-34942 | 2/1997 |
| JP | 9-297832 | 11/1997 |
| JP | 2000-90333 | 3/2000 |
| JP | 2000-268237 | 9/2000 |
| WO | 00/28460 | 5/2000 |

OTHER PUBLICATIONS

Equipping a startup company Martin Rowe. Test & Measurement World. Boston: Jan. 2000. vol. 20, Iss. 1; p. 36.*

* cited by examiner

*Primary Examiner*—Mary Cheung
*Assistant Examiner*—Brian Fertig
(74) *Attorney, Agent, or Firm*—Hamre, Schumann, Mueller & Larson, P.C.

(57) ABSTRACT

A measurement instrument reads information on the guarantee number-of-measurements issued depending on the payment of purchased consumables from a magnetic card (21), stores the information in a guarantee number of measurements storage unit (31), stores the actual number of measurements in a number of measurements storage unit (32), stores the remainder of subtraction of the actual number of measurements stored in the number of measurements storage unit (32) from the guarantee number of measurements stored in the guarantee number of measurements storage unit (31) in a remainder storage unit (33). When the remainder reaches a predetermined value, the measurement instrument outputs a message to invite to purchase a new magnetic card to a display unit (4).

8 Claims, 5 Drawing Sheets

MEASUREMENT INSTRUMENT

TECHNICAL FIELD

The present invention relates to a measurement instrument for measuring components in a specimen such as blood.

BACKGROUND ART

In recent years, in a medical institution such as a hospital, a method of introducing a specimen examination instrument, etc. by purchase has been shifted to a method referred to as "instrument lease and system sale" of introducing a specimen examination instrument by lease. In the latter method, reagents and consumables are sold at a price including a lease charge for the specimen examination instrument. A user makes a promise to purchase a certain amount of reagents or consumables during a certain number of measurements or during a certain period.

As compared with a conventional method in which a user purchases a specimen examination instrument, there is a merit that a medical institution can introduce a specimen examination instrument easily because the medical institution is not charged at one time for purchasing the instrument, and further because the instrument does not belong to the assets of the medical institution, so that the burden imposed on the medical institution that introduces the instrument is reduced.

However, in the case where the reagents or consumables become unusable before the assumed period or assumed number of measurements, the user of the instrument has to purchase reagents or consumables. Consequently, in fact, the user has to pay an extra lease charge for the instrument.

DISCLOSURE OF THE INVENTION

It is an object of the present invention to provide a measurement instrument in which a number of measurements is sold and the number of selling thereof is managed unlike conventionally selling reagents or consumables at a price including a lease charge of a specimen examination instrument.

In order to achieve the above-mentioned object, the measurement instrument according to the present invention includes a guarantee number storage unit for storing a guarantee number of measurements issued in accordance with a charge of reagents or consumables purchased or contracted to purchase; a measurements number storage unit for storing a number of executed measurements; a remainder storage unit for storing a value, as a remainder, obtained by subtracting the number of measurements stored in the measurements number storage unit from the guarantee number of measurements stored in the guarantee number storage unit; and an update request unit for outputting a request to update the guarantee number of measurements when it is detected that the remainder stored in the remainder storage unit reaches a predetermined value.

According to the above-mentioned configuration, when the number of the executed measurements reaches the guarantee number of measurements, the measurement instrument outputs a message, etc. requesting to update the guarantee number of measurements (that is, to purchase or to contract to purchase reagents or consumables). Thus, the user of the measurement instrument may add reagents or consumables in accordance with the used state of the measurement instrument, therefore the user does not have to pay excess charges. Furthermore, the provider of the measurement instrument has an advantage that it is possible to realize a stable profit because reagents or consumables continuously are purchased by a user of the measurement instrument.

It is preferable that the measurement instrument further includes a replacement request unit for outputting a replacement request for replacement of reagents or consumables when an abnormality caused by the reagents or consumables is detected.

According to the above-mentioned configuration, in the case where an abnormality occurring in the measurement instrument is detected and the abnormality is caused by the reagents or consumables, it is possible to request the provider of the measurement instrument to replace reagents or consumables. In such a case, for example, the provider may respond to the request for replacement of reagents or consumables at no charge. Thus, it is possible to improve the service to the user of the measurement instrument.

It is preferable that the measurement instrument is connected to an information processing device of a procurement source of the reagents or consumables via a communication line, and the replacement request is sent to the information processing device via the communication line.

According to the above-mentioned configuration, it is possible to send a request for replacement of reagents or consumables to the provider via the communication line. Therefore it is possible to refill reagent or consumables promptly.

Furthermore, the method for billing a user of a measurement instrument includes: issuing a guarantee number of measurements in accordance with the charge of reagents or consumables purchased or contracted to purchase, and allowing the issued guarantee number of measurements to be stored in the measurement instrument; allowing a value obtained by subtracting the number of measurements executed by the measurement instrument from the guarantee number of measurements as a remainder to be stored in the measurement instrument; and outputting the request to update the guarantee number of measurements when the remainder reaches the predetermined value.

Thus, since the user of the measurement instrument may additionally purchase reagents or consumables in accordance with the used state of the measurement instrument, the user does not have to pay excess charge. Furthermore, the provider of the measurement instrument has an advantage that it is possible to realize a stable profit because reagents or consumables continuously are purchased by a user of the measurement instrument.

BEST MODE OF CARRYING OUT THE INVENTION

Hereinafter, one embodiment of the present invention will be explained with reference to the drawings.

Figure 1:
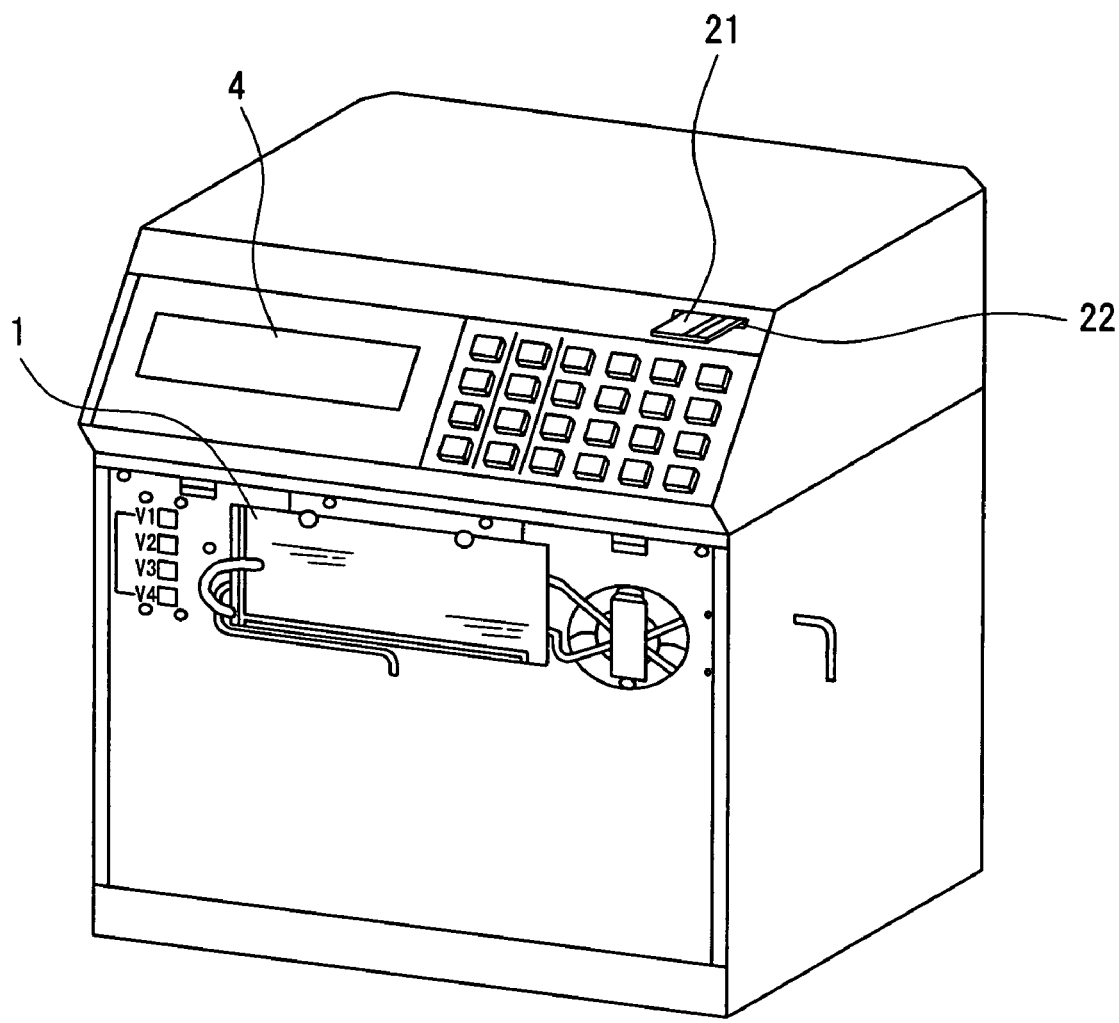
FIG. 1 is an external view showing a measurement instrument according to one embodiment of the present invention.

FIG. 1 is a perspective view showing an external view of a measurement instrument according to one embodiment of the present invention. The measurement instrument according to the embodiment is an automatic glycohemoglobin measurement instrument for measuring the concentration of glycohemoglobin in blood by high performance liquid chromatography.

A medical institution that is a user of the automatic glycohemoglobin measurement instrument according to the embodiment is provided with a measurement instrument from a provider of the measurement instrument on the condition that the medical institution purchases six/year or more of magnetic cards in which information on the guarantee of 2000 measurements is written. The purchase price of the magnetic card covers a guarantee for the number of measurements of reagents such as a column or an eluent etc., or consumables.

When the medical institution purchases a magnetic card in which information on the guarantee of 2000 measurements is recorded, it is provided with a column together with this magnetic card from the measurement instrument provider. The medical institution attaches the provided column to the inside of a constant temperature bath 1 as shown in FIG. 1 and inserts the provided magnetic card 21 into a magnetic card reader 22.

Hereinafter, an internal configuration and operation of the measurement instrument of the embodiment will be explained with reference to FIGS. 2 and 3.

Figure 2:
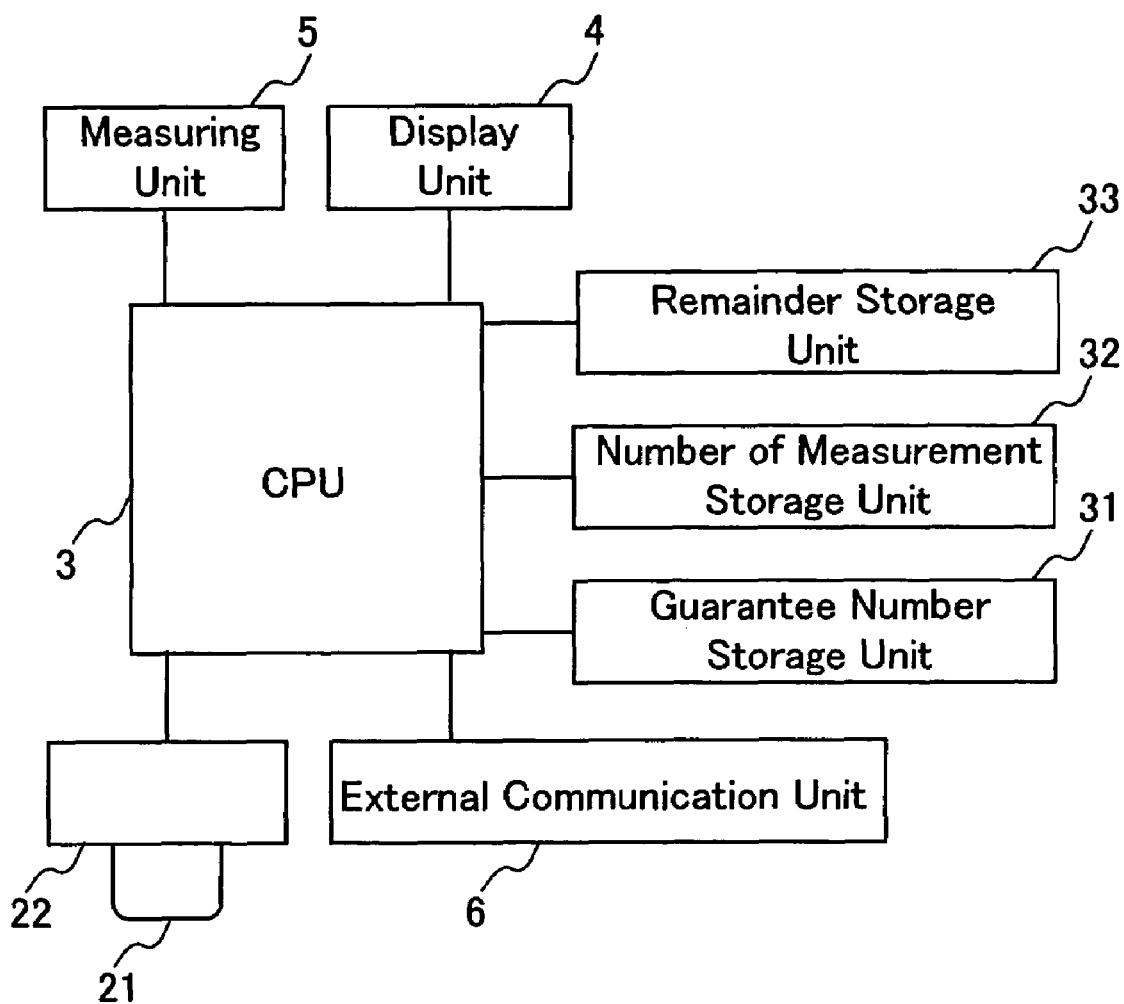
FIG. 2 is a block diagram showing an internal configuration of the measurement instrument.
Figure 3:
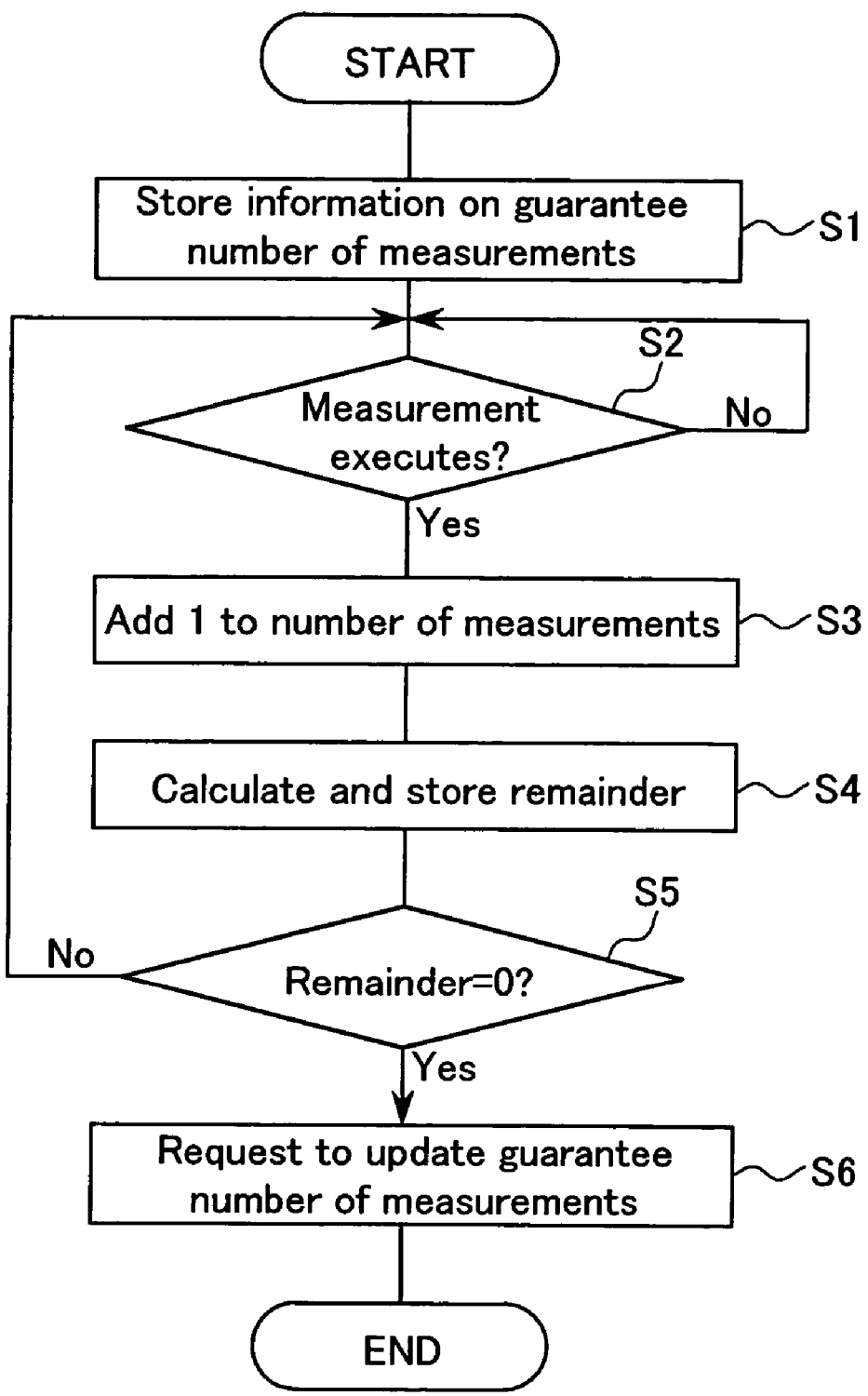
FIG. 3 is a flow chart showing an operation of the measurement instrument.

As shown in FIG. 2, the measurement instrument includes a CPU 3, a measuring unit 5, an external communication unit 6, a guarantee number storage unit 31, a measurements number storage unit 32 and a remainder storage unit 33.

The CPU 3 controls an entire operation of the measurement instrument. The measuring unit 5 controls the measurement of the concentration of glycohemoglobin in blood by high performance liquid chromatography using the column. The external communication unit 6 performs a communication with an external device via a network such as the Internet, etc.

The CPU 3 allows the magnetic card reader 22 to read out the information on the guarantee of 2000 measurements recorded in the magnetic card 21 and stores the read out information on the guarantee of measurements into the guarantee number storage unit 31 (step S1).

The CPU 3 obtains the measurement information from the measuring unit 5 when the measuring unit 5 executes the measurement of glycohemoglobin (when the result of the step S2 is Yes), and adds 1 to the number of measurements stored in the measurements number storage unit 32 (step S3) and at the same time stores a value (remainder) obtained by subtracting the number of measurements stored in the measurements number storage unit 32 from "2000" that is a number stored in the guarantee number storage unit 31 into the remainder storage unit 33 (step S4).

After the measurement instrument repeats measurements, and when the remainder stored in the remainder storage unit 33 becomes "0" (when the result of the step S5 is Yes), the CPU 3 judges that measurements corresponding to the guarantee number of measurements were carried out and displays a message indicating "Number of measurements is finished. Please purchase a new magnetic card" on a display unit 4 (step S6).

Note here that the timing for displaying a message to urge a user to purchase a new magnetic card is not limited to the time when the remainder becomes "0" and may be the time when the remainder reaches a predetermined value. Furthermore, a configuration may be employed in which the timing for displaying the message is adjusted for each measurement instrument.

When an abnormality occurs during measurement, etc., the measuring unit 5 sends information on the abnormality to the CPU 3. The CPU 3 analyzes the information on the abnormality and examines the cause of the abnormality. For example, when the half-width of the absorbance pattern of the measurement data becomes a predetermined value or more, etc., it can be judged that a column has deteriorated. The half-width of the absorbance pattern means the width of the pattern at the location corresponding to half the peak value of the absorbance. The CPU 3 produces information for requesting for replacement of the column with a new one when an abnormality occurs in the measurement instrument due to the deterioration of the column before the remainder stored in the remainder storage unit 33 becomes 0.

When the CPU 3 produces the information for requesting the replacement, the display unit 4 displays a message indicating "An abnormality occurs in the column within the guarantee number of measurements." When this message is displayed, the medical institution makes a contact with the measurement instrument provider so as to request the replacement of columns.

The measurement instrument of the embodiment includes an external communication unit 6 capable of communicating with a server (not shown) of the measurement instrument provider via a communication medium such as the Internet, etc. When the CPU 3 produces information for requesting the replacement, the CPU 3 is connected to the server of the measurement instrument provider via the external communication unit 6 and reports that an abnormality occurs in the column within the guarantee number of measurements. Thus, the measurement instrument provider can understand promptly that an abnormality occurs in the measurement instrument and reagents or consumables need to be replaced or refilled. Therefore, it is possible to minimize the influence caused by stopping the operation of the measurement instrument. Furthermore, for medical institutions, it is advantageous to eliminate the time and labor for making a contact, for example, making a telephone call, etc. to the measurement provider.

Note here that as the preferable embodiment of the present invention, in the case where the replacement of the columns, etc. is carried out when an abnormality occurs in the measurement instrument, the user is allowed to select either the following (1) or (2) by comparing the remainder stored in the remainder storage unit 33 with the lifetime of the replaced column: that is, (1) to purchase a new column after the remainder is used up; or (2) to pay an additional charge for continuous use of the replaced column beyond the present remainder and to update the remainder in accordance with the paid charges.

Figure 4:
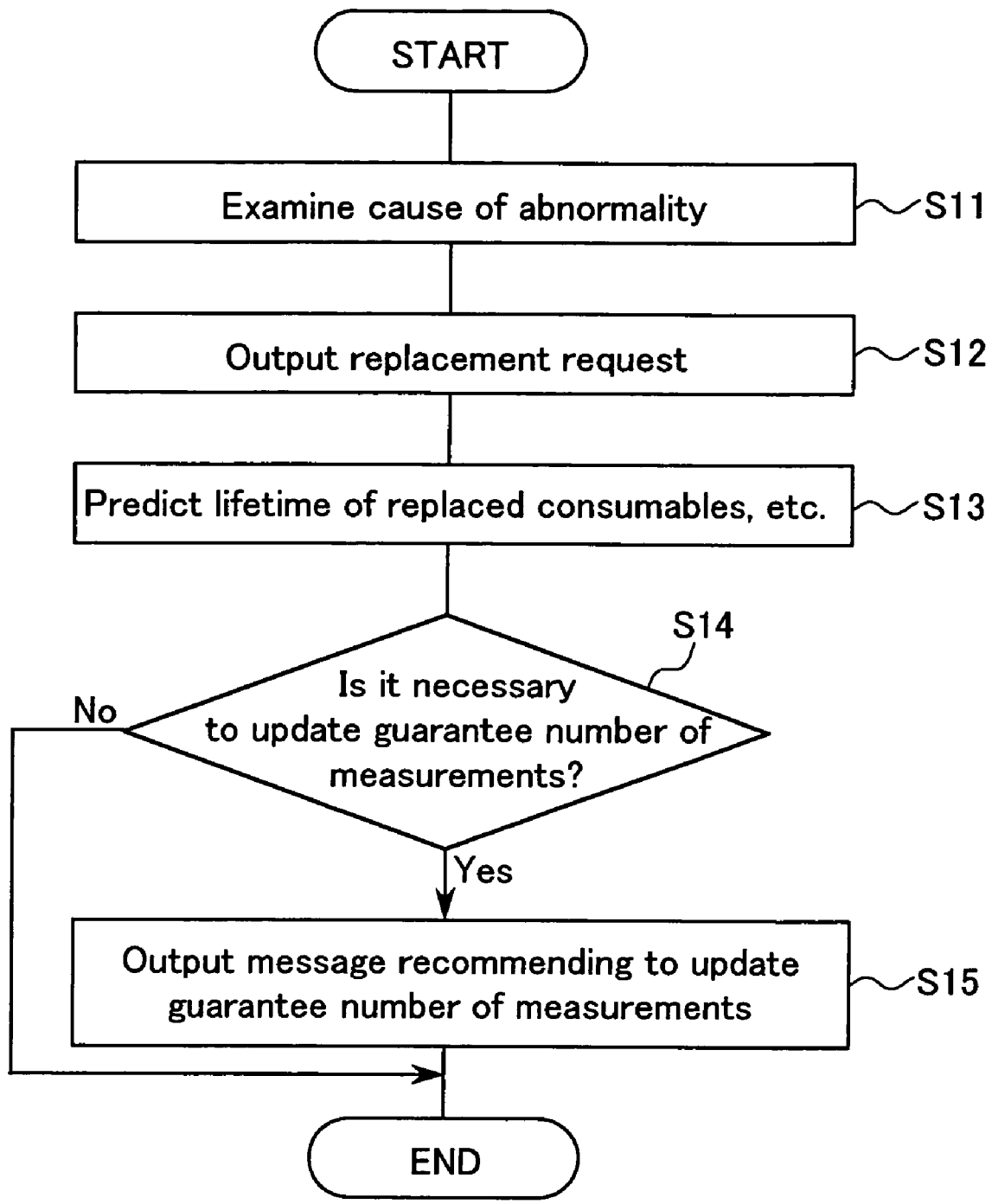
FIG. 4 is a flow chart showing an operation in the case where an abnormality occurs in the measurement instrument.

In this case, the CPU 3 operates as shown in FIG. 4.

The CPU 3 receives the information on an abnormality from the measuring unit 5, analyzes the information on an abnormality and examines the cause of the abnormality (step S11).

When it is judged that the abnormality is caused by reagents or consumables, the CPU 3 outputs information for requesting the replacement (step S12). The display unit 4 receives the information for requesting the replacement and displays a message indicating "An abnormality occurs in the column within the guarantee number of measurements."

When this message is output, for example, the medical institution requests the measurement instrument provider to dispatch a maintenance staff for replacement of the column. Then, the maintenance staff replaces the column with a new one. When the columns are replaced, the CPU 3 predicts the number of possible measurements by the replaced column (lifetime) (step S13).

Figure 5:
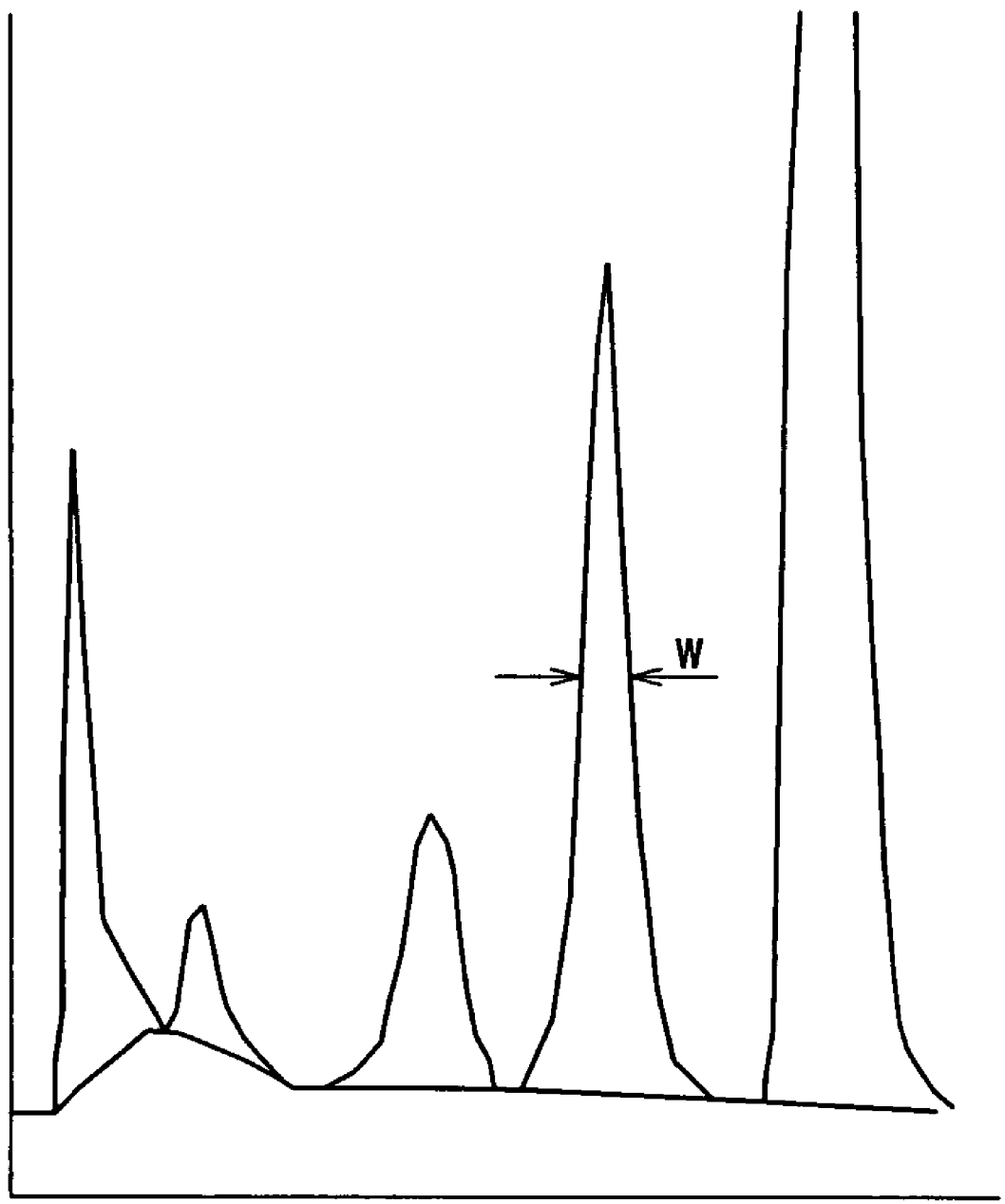
FIG. 5 is a view to explain a method for predicting the lifetime of consumables used in the measurement instrument.

The prediction of the lifetime of the column in step S13 can be carried out by, for example, the following method. In the case of liquid chromatography, the width of the absorbance pattern is varied in accordance with the deterioration degree of the column. For example, in the case of a chromatogram shown in FIG. 5, it is known that the half-width of the absorbance of hemoglobin A1c that is a component to be measured is gradually increased in accordance with the deterioration of the column. The half width of the absorbance means the width of the pattern at the location corresponding to half the peak value of the absorbance (w in FIG. 5). Therefore, the CPU 3 can predict the number of measurements that can be carried out in the future by using the replaced column (number of possible measurements).

The CPU 3 judges the necessity of updating the information on the guarantee number of measurements by comparing the number of possible measurements predicted in step S13 with the remainder stored in the remainder storage unit 33 (step S14). For example, in the case where the remainder is "1000" while the predicted number of possible measurements is "1100," it is predicted that 100 more measurements can be carried out after the remainder is used up. However, by considering the measurement accuracy etc., it seems to be advantageous for a medical institution, that is, a user of the measurement instrument to purchase a new column after the remainder is used up. On the other hand, for example, in the case where the remainder is "100" while the predicted number of possible measurements is "1800," when the remainder is used up, it is predicted that 1700 more measurements can be carried out. In this case, it is advantageous for a medical institution to pay for, for example, charge for 1700 measurements and to update information on the guarantee number of measurements because the replaced column is not wasted. Note here that in the step S14, as to the method for judging whether or not the information on the guarantee number of measurements is updated, arbitrary embodiments are possible by considering various factors including kinds of measurement instruments and frequency of use, the relationship between the deterioration degree of reagents or consumables to be replaced and the measurement accuracy, etc.

The CPU 3 displays a message on a display unit 4, indicating that a user can use the replaced column to the end by paying an additional charge when it is judged that the information on the guarantee number of measurements should be updated (when the result of step S14 is Yes) (step S15).

Herein, if the medical institution pays an additional charge, it is provided with, for example, a magnetic card in which information on the guarantee number for the additional charge is recorded by the measurement instrument provider. Thereby, the medical institution can use up the replaced column to the end.

Note here that in the embodiment of the present invention, an automatic glycohemoglobin measurement instrument was mentioned. The present invention is not necessarily limited to the automatic glycohemoglobin measurement instrument and can be applied to any measurement instruments including a glucose measurement instrument by an enzyme electrode method by a GOD fixation enzyme film and a hydrogen peroxide electrode, an automatic urine analyzer using a test paper, etc.

Furthermore, in the embodiment, an example in which the magnetic card 21 functions as a prepaid card provided by the measurement instrument provider in return for the purchase charge was mentioned. However, the charge is not necessarily paid before the magnetic card 21 starts to be used. The purchase charge may be paid over a deferred term as long as at least a purchase contract is signed up.

Furthermore, in the embodiment, as an information recording medium for recording information on the guarantee number of measurements, the magnetic card was taken as an example. However, the recording medium is not necessarily limited to the magnetic card and any other information recording media such as an IC card may be used. Furthermore, in the embodiment, the information on the guarantee number of measurements read out from a magnetic card is stored in the guarantee number storage unit 31 inside the measurement instrument. However, by placing the information recording medium in which information on the guarantee number of measurements is stored to the measurement instrument, this information recording medium may be allowed to function as a guarantee number storage unit 31. Alternatively, a configuration may be employed in which the information on guarantee number of measurements is sent from the server of the measurement instrument provider to the measurement instrument and an external communication unit 6 writes the information on the guarantee number of measurements, which is received from the server, in the guarantee number storage unit 31.

Furthermore, the information on the number of measurements or the information on an abnormality may be sent from the external communication unit 6 to the server of the measurement instrument and at the server of the measurement instrument provider, the information on the remainder may be managed.

As mentioned above, according to the present invention, for a user of a measurement instrument, it is advantageous that the number of measurements corresponding to the charge for using the instrument be included in the purchase price of reagents or consumables. Furthermore, even in the case where the user additionally purchases reagents or consumables because reagents or consumables become unusable before reaching the assumed numbers, it is possible to use the remainder without waste, avoiding the loss for the user.

INDUSTRIAL APPLICABILITY

The present invention can provide a measurement instrument capable of selling the number of measurements and managing the number of sales instead of the conventional method of selling reagents or consumables at the price including the lease charge in addition to the price of the specimen examination instrument.

The invention claimed is:

1. A measurement instrument, comprising:
    a measuring unit measuring a component in a specimen using reagents or consumables;
    a guarantee number storage unit storing a predetermined guarantee number of measurements issued in accordance with a charge of reagents or consumables purchased or contracted to purchase;
    a measurements number storage unit storing a number of measurements executed by the measuring unit;
    a remainder storage unit storing a value, as a remainder, obtained by the measurement instrument subtracting the number of measurements stored in the measurements number storage unit from the predetermined guarantee number of measurements stored in the guarantee number storage unit; and
    an update request unit outputting a request to update the predetermined guarantee number of measurements when it is detected that the remainder stored in the remainder storage unit reaches a threshold value.

2. The measurement instrument according to claim 1, further comprising a replacement request unit outputting a replacement request for replacement of reagents or consumables when an abnormality caused by the reagents or consumables is detected.

3. The measurement instrument according to claim 2, which is connected to an information processing device of a procurement source of the reagents or consumables via a communication line, and the replacement request is sent to the information processing device via the communication line.

4. The measurement instrument according to claim 1, further comprising:
   a lifetime predicting unit predicting the number of possible measurements by the replaced reagents or consumables when reagents or consumables are replaced after the replacement request unit outputs the replacement request; and
   an update necessity judging unit judging whether or not the predetermined guarantee number of measurements is necessary to be updated by comparing the number of possible measurements predicted by the lifetime predicting unit with the remainder stored in the remainder storage unit, end outputting the update request to update the predetermined guarantee number of measurements when it is judged that update is necessary.

5. The measurement instrument according to claim 1, wherein the guarantee number storage unit is a memory for storing the predetermined guarantee number of measurements read out from an information recording medium in which the predetermined guarantee number of measurements are issued in accordance with the charge of reagents or consumables purchased or contracted to purchase.

6. The measurement instrument according to claim 1, wherein as the guarantee number storage unit, a measurement instrument in which the predetermined guarantee number of measurements issued in accordance with the charge of reagents or consumables purchased or contracted to purchase and which can be attached/detached to/from the measurement instrument, is used.

7. The measurement instrument according to claim 1, wherein the guarantee number storage unit is a memory for storing the predetermined guarantee number of measurements via a communication medium from the external instrument, and the predetermined guarantee number of measurements is issued in accordance with a charge of reagents or consumables purchased or contracted to purchase.

8. A method for billing a user of a measurement instrument, the method comprising:
   issuing a predetermined guarantee number of measurements in accordance with the charge of reagents or consumables purchased or contacted to purchase, and allowing the issued predetermined guarantee number of measurements to be stored in the measurement instrument, the measurement instrument comprising a measuring unit for measuring a component in a specimen by using reagents or consumables;
   allowing a value obtained by the measurement instrument automatically subtracting the number of measurements executed by the measuring unit of the measurement instrument from the predetermined guarantee number of measurements as a remainder to be stored in the measurement instrument; and
   outputting a request to update the predetermined guarantee number of measurements when the remainder reaches a threshold value.

* * * * *